(12) United States Patent
Gummalla et al.

(10) Patent No.: US 6,999,414 B2
(45) Date of Patent: Feb. 14, 2006

(54) SYSTEM AND METHOD FOR COMBINING REQUESTS FOR DATA BANDWIDTH BY A DATA PROVIDER FOR TRANSMISSION OF DATA OVER AN ASYNCHRONOUS COMMUNICATION MEDIUM

(75) Inventors: Ajay Chandra V. Gummalla, Atlanta, GA (US); Dolors Sala, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 884 days.

(21) Appl. No.: 09/783,311

(22) Filed: Feb. 15, 2001

(65) Prior Publication Data

US 2002/0154655 A1    Oct. 24, 2002

Related U.S. Application Data

(63) Continuation-in-part of application No. 09/427,792, filed on Oct. 27, 1999, now Pat. No. 6,804,251.

(60) Provisional application No. 60/182,470, filed on Feb. 15, 2000, provisional application No. 60/247,188, filed on Nov. 9, 2000, provisional application No. 60/254,415, filed on Dec. 8, 2000, provisional application No. 60/262,201, filed on Jan. 17, 2001, provisional application No. 60/262,203, filed on Jan. 17, 2001.

(51) Int. Cl.
*H04J 3/16* (2006.01)
*H04H 1/00* (2006.01)
*H04N 7/10* (2006.01)

(52) U.S. Cl. ............ 370/230; 370/395.21; 370/395.41; 370/468; 725/95; 725/97; 725/111

(58) Field of Classification Search ............... 370/230, 370/231, 235, 345, 346, 349, 352, 389, 395.1, 370/395.2, 395.21, 395.4, 395.41, 395.42, 370/395.43, 395.52, 412, 428, 429, 468, 370/477; 709/230, 232, 238, 240; 725/87, 725/70, 91, 93, 95, 97, 98, 109, 111, 114, 725/116, 118, 144, 148
See application file for complete search history.

(56) References Cited

U.S. PATENT DOCUMENTS 4,534,024 A    8/1985  Maxemchuk et al.

(Continued)

FOREIGN PATENT DOCUMENTS

EP    0573739 A2 *  12/1993

(Continued)

OTHER PUBLICATIONS

"Radio Frequency Interface Specification SP-RFlv1.1-l02-990731," Data-Over-Cable Service Interface Specifications, Jul. 31, 1999, retrieved from the Internet on Oct. 23, 2001:<URL:http://www.tconl.com/ikleens/DOCSIS.pdf>, pp. i-iv, 132-139 and 291-296.

(Continued)

*Primary Examiner*—Alpus H. Hsu
(74) *Attorney, Agent, or Firm*—Sterne, Kessler, Goldstein & Fox P.L.L.C.

(57) ABSTRACT

A method and system for combing requests for data bandwidth by a data provider for transmission of data over an asynchronous communication medium is provided. A headend receives one or more bandwidths requests from one or more cable modems via upstream communication. A scheduler then combines one or more bandwidths requests from the same cable modem to create a single data burst bandwidth. The headend then grants the data burst bandwidth to the appropriate cable modem via downstream communication.

30 Claims, 7 Drawing Sheets

U.S. PATENT DOCUMENTS

| | | | |
|---|---|---|---|
| 4,712,210 A | 12/1987 | Davis et al. | |
| 5,341,374 A | 8/1994 | Lewen et al. | |
| 5,421,030 A | 5/1995 | Baran | |
| 5,425,027 A | 6/1995 | Baran | |
| 5,469,495 A | 11/1995 | Beveridge | |
| 5,515,379 A | 5/1996 | Crisler et al. | |
| 5,539,449 A | 7/1996 | Blahut et al. | |
| 5,570,355 A | 10/1996 | Dail et al. | |
| 5,606,561 A | 2/1997 | Scheibel, Jr. et al. | |
| 5,631,908 A | 5/1997 | Saxe | 370/235 |
| 5,742,592 A | 4/1998 | Scholefield et al. | |
| 5,756,280 A | 5/1998 | Soora et al. | |
| 5,850,400 A | 12/1998 | Eames et al. | 370/443 |
| 5,926,478 A | 7/1999 | Ghaibeh et al. | 370/395 |
| 5,963,557 A | 10/1999 | Eng | |
| 5,982,780 A | 11/1999 | Bohm et al. | |
| 6,055,268 A | 4/2000 | Timm et al. | |
| 6,185,224 B1 | 2/2001 | Limb et al. | |
| 6,259,695 B1 | 7/2001 | Ofek | |
| 6,359,901 B1 * | 3/2002 | Todd et al. | 370/465 |
| 6,421,355 B1 * | 7/2002 | Quiring et al. | 370/468 |
| 6,438,630 B1 * | 8/2002 | DeMoney | 710/56 |
| 6,463,484 B1 * | 10/2002 | Moss | 710/36 |
| 6,546,017 B1 * | 4/2003 | Khaunte | 370/412 |
| 6,580,730 B1 | 6/2003 | Loukianov | |
| 6,628,609 B1 * | 9/2003 | Chapman et al. | 370/229 |
| 6,724,772 B1 * | 4/2004 | Borland et al. | 370/442 |
| 6,804,251 B1 | 10/2004 | Limb et al. | |
| 6,917,614 B1 * | 7/2005 | Laubach et al. | 370/392 |

FOREIGN PATENT DOCUMENTS

| | | |
|---|---|---|
| EP | 0 774 848 A2 | 5/1997 |
| EP | 0 829 986 A1 | 3/1998 |
| EP | 0 844 803 A2 | 5/1998 |
| EP | 0 912 016 A2 | 4/1999 |
| WO | WO 99/18718 | 4/1999 |
| WO | WO 99/30449 | 6/1999 |

OTHER PUBLICATIONS

Copy of International Search Report issued Nov. 8, 2001, for Appln. No. PCT/US01/04841, 5 pages.

Copy of International Search Report issued Nov. 8, 2001, for Appln. No. PCT/US01/04904, 4 pages.

Sala, D. et al., "Adaptive Control Mechanism for Cable Modem MAC Protocols," *Proceedings of the IEEE INFOCOM,* IEEE, vol. 3, Mar. 29, 1988, pp. 1392-1399.

Copy of International Search Report issued Sep. 28, 2001, for Appln. No. PCT/US01/04819, 7 pages.

Limb, J. et al, "An Access Protocol to Support Multimedia Traffic Over Hybrid Fiber/Coax Systems", Proceedings of the International Workshop on Community Networking Integrated Multimedia Services to the Home, Jun. 20, 1995, pp. 35-40.

Copy of International Search Report for Appl. No. PCT/US01/04820 issued Sep. 27, 2001, 8 pages.

John O. Limb and Dolors Sala, A Protocol for Efficient Transfer of Data over Hybrid Fiber/Coax Systems, article in IEEE/ACM Transactions on Networking, vol. 5, No. 6, pp. 872-881, Dec. 1997.

* cited by examiner

SYSTEM AND METHOD FOR COMBINING REQUESTS FOR DATA BANDWIDTH BY A DATA PROVIDER FOR TRANSMISSION OF DATA OVER AN ASYNCHRONOUS COMMUNICATION MEDIUM

CROSS-REFERENCE TO RELATED APPLICATIONS

This application claims the benefit of the following provisional applications:

U.S. Provisional Application Ser. No. 60/182,470, entitled "Intelligent Silence Suppression," filed Feb. 15, 2000, by Gummalla et al., (incorporated by reference in its entirety herein).

U.S. Provisional Application Ser. No. 60/247,188, entitled "A Local Scheduling Mechanism for Cable Modems," filed Nov. 9, 2000, by Sala et al., (incorporated by reference in its entirety herein).

U.S. Provisional Application Ser. No. 60/254,415, entitled "A Local Scheduling Mechanism for Cable Modems," filed Dec. 8, 2000, by Sala et al., (incorporated by reference in its entirety herein).

U.S. Provisional Application Ser. No. 60/262,201, entitled "Voice Scheduling Algorithms," filed Jan. 17, 2001, by Sala et al., (incorporated by reference in its entirety herein).

U.S. Provisional Application Ser. No. 60/262,203, entitled "Concatenation of Requests at CMTS," filed Jan. 17, 2001, by Sala et al., (incorporated by reference in its entirety herein).

This application is a continuation-in-part of U.S. patent Ser. No. 09/427,792, entitled "System and Method for Multiplexing Data from Multiple Sources," filed Oct. 27, 1999, by Limb et al., now U.S. Pat. No. 6,804,251 (incorporated by reference in its entirety herein).

This application is related to the following non-provisional applications, all having the same filing date as the present application:

"Method, System and Computer Program Product for Scheduling Upstream Communications", U.S. patent Ser. No. 09/783,404, by Gummalla et al. (incorporated by reference in its entirety herein).

"Voice Architecture For Transmission Over A Shared, Contention Based Medium," U.S. patent Ser. No. 09/785,020, by Gummalla et al. (incorporated by reference in its entirety herein).

"System and Method for Suppressing Silence in Voice Traffic over an Asynchronous Communication Medium," U.S. patent Ser. No. 09/783,405, by Gummalla et al. (incorporated by reference in its entirety herein).

"Cable Modem System and Method for Specialized Data Transfer," U.S. patent Ser. No. 09/783,403, by Bunn et al., (incorporated by reference in its entirety herein).

BACKGROUND OF THE INVENTION

1. Field of the Invention

The present invention is generally related to increasing the efficiency of providing requested bandwidth to a data provider via asynchronous communication mediums.

2. Background Art

The importance to the modern economy of rapid data access and exchange cannot be overstated. This explains the exponentially increasing popularity of the data access and exchange via cable networks (including coaxial cable or Hybrid fiber coaxial cable), the Internet, intranets, wireless networks, satellites and so forth (i.e., communication mediums). Rapid data access and exchange is partly dependent upon how efficiently bandwidth is allocated to a data provider in order for the data provider to transfer the requested data to a user via one of the communication mediums mentioned above.

One very desirable solution for rapid data access and exchange is via cable networks and cable modems. Cable modems provide asynchronous communications on cable networks. In general, a user connects a cable modem to the TV outlet for his or her cable TV, and the cable TV operator connects a cable modem termination system ("CMTS") in the operator's headend. The CMTS is a central device for connecting the cable network to a data network like the Internet. The CMTS is a central distribution point for a cable system. Data flows "downstream" from the CMTS to the cable modem (i.e., downstream communication). Alternatively, data flows "upstream" from the cable modem to the CMTS (i.e., upstream communication).

A common cable modem standard today is the Data Over Cable Service Interface Specification ("DOCSIS"). DOCSIS defines technical specifications for both cable modems and CMTS. DOCSIS downstream communication is quite restrictive in the way the control information is conveyed to the data provider (e.g., cable modem) via a DOCSIS CMTS scheduler. What is needed is to override the CMTS scheduler of DOCSIS and provide a CMTS scheduler that reduces the overhead of bandwidth grants via downstream communication by providing flexibility in the allocation of the bandwidth.

BRIEF SUMMARY OF THE INVENTION

The present invention is a system and method for combining requests for bandwidth by a data provider for transmission of data over an asynchronous communication medium. An embodiment of the method comprises the first step of receiving bandwidth requests from one or more data providers, each bandwidth request having a data provider identifier, a priority identifier, and the amount of required bandwidth. The next step is storing each of the bandwidth requests in a data structure so as to maintain the order in which the bandwidth requests were received. The third step is, based on the priority identifier and the order of each bandwidth request, scheduling each the bandwidth request in an order to be serviced. The next step is combining each of the bandwidth requests having the same the data provider identifier into a data burst bandwidth. The final step is granting the data burst bandwidth to the data provider over the asynchronous communication medium.

In another embodiment of the method of the present invention, the first step involves receiving bandwidth requests from one or more data providers, each bandwidth request having a data provider identifier, a priority identifier, and the amount of required bandwidth. The second step is combining, by data provider identifier and priority identifier, the amount of bandwidth required to represent a data burst bandwidth. The fourth step is, based on one or more quality of service parameters (which varies from priority to priority), scheduling each the data burst bandwidth in an order to be serviced. The final step involves granting the data burst bandwidth to the data provider over the asynchronous communication medium.

An embodiment of the system comprises a headend and a scheduler that are coupled together. The scheduler receives bandwidth requests from one or more data providers, each bandwidth request having a data provider identifier, a priority identifier, and the amount of required bandwidth. The scheduler then stores each of the bandwidth requests in a data structure so as to maintain the order in which the bandwidth requests were received. Then the scheduler schedules each the bandwidth request in an order to be serviced based on the priority identifier and the order of each bandwidth request. Next, the scheduler combines each of the bandwidth requests having the same the data provider identifier into a data burst bandwidth. Finally, the headend grants the data burst bandwidth to the data provider over the asynchronous communication medium.

Another embodiment of the system also includes a headend and a scheduler coupled together. Here, the scheduler receives bandwidth requests from one or more data providers, each bandwidth request having a data provider identifier, a priority identifier, and the amount of required bandwidth. The scheduler then combines, by data provider identifier and priority identifier, the amount of bandwidth required to represent a data burst bandwidth. The scheduler, based on one or more quality of service parameters (which varies from priority to priority), schedules each the data burst bandwidth in an order to be serviced. Finally, headend grants the data burst bandwidth to the data provider over the asynchronous communication medium.

BRIEF DESCRIPTION OF THE DRAWINGS/FIGURES

The present invention will be described with reference to the accompanying drawings, wherein.

DETAILED DESCRIPTION OF THE INVENTION

A. Overview of the Invention

For illustration purposes, the present invention is described in terms of being utilized with a cable network. It should be understood that the present invention is not limited to use with a cable network. In fact, the present invention may be used with any communication medium, including but not limited to, the Internet, intranets, fiber optic networks, wireless networks and satellites.

Data in the present invention includes any type of information. This includes, but is not limited to, digital, voice, video, audio, etc.

B. System Architecture Overview

Figure 1:
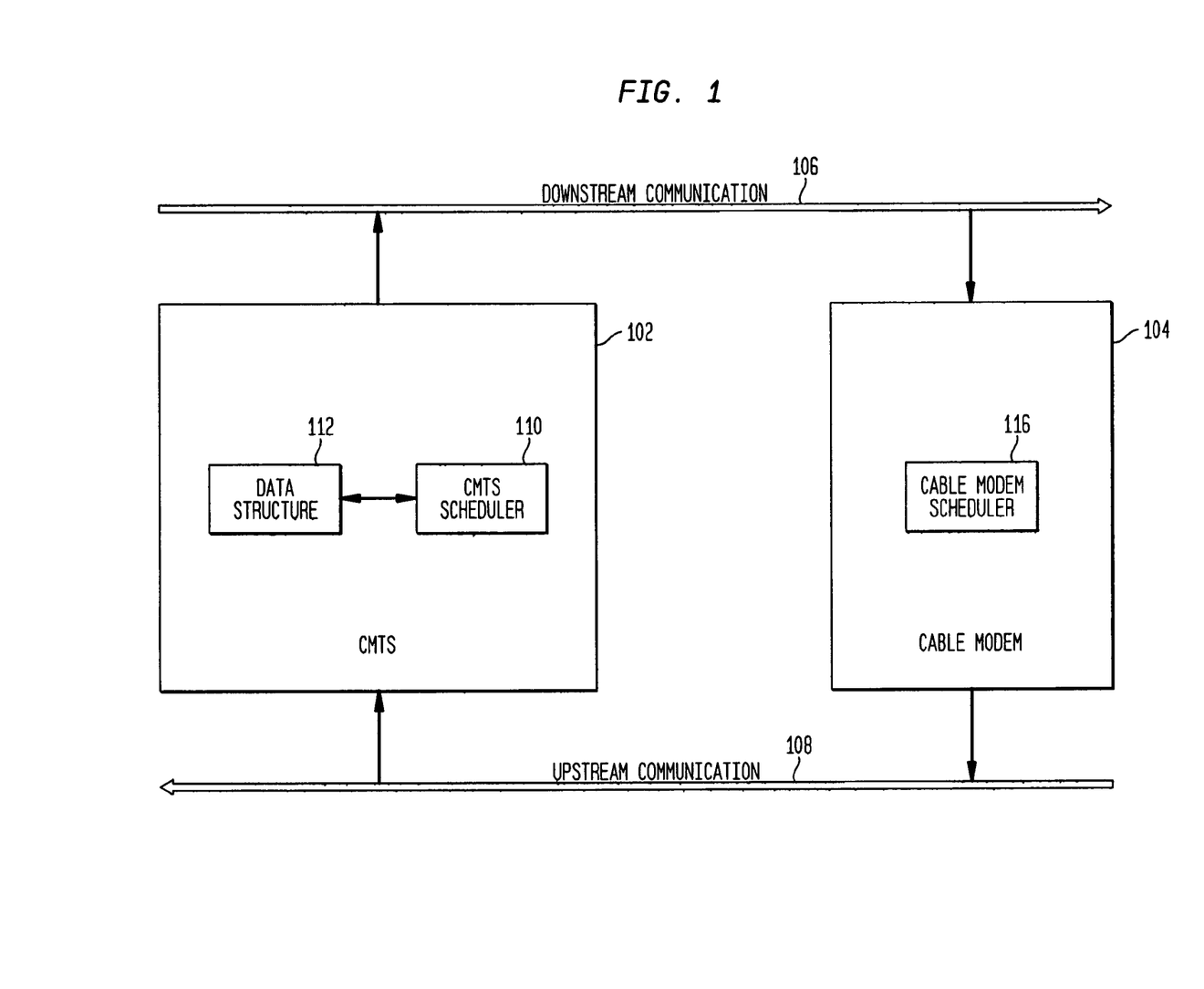
FIG. 1 is a block diagram representing an example operating environment of the present invention according to an embodiment of the present invention.

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 1, a CMTS 102, a cable modem 104, downstream communication 106 and upstream communication 108, are shown. CMTS 102 further includes a CMTS scheduler 102 and a data structure 112. Cable modem 104 includes a cable modem scheduler 116. Each of these components will be briefly described next.

In general, cable modem 104 forwards or provides data via asynchronous communications on cable networks. Cable modem 104 receives data from a user that needs to be transferred via a cable network. In order to do this, cable modem 104 requests that CMTS 102 grant to it the necessary bandwidth.

As mentioned, cable modem 104 receives data from a user to be transferred via a cable network. Different types of data require different modes of transfer since the importance of timing is different with different types of data. For example, voice data cannot tolerate delays in its transfer. Alternatively, the type of data involved in web surfing can tolerate delays in its transfer.

In order to ensure the importance of timing is maintained, cable modem 104 assigns different priority identifiers to different types of data. The higher the priority a data has, the less of a delay that type of data will experience in its transfer via the cable network. Thus, voice data would be assigned a priority identifier with a higher priority than data involved in web surfing.

Cable modem scheduler 116 is coupled to cable modem 104. Cable modem scheduler 116 is described in detail in related non-provisional application, entitled "Method, System and Computer Program Product for Scheduling Upstream Communications", (Ser. No. 09/783,404), filed concurrently with the present invention (incorporated herein by reference in its entirety). In general, cable modem scheduler 116 is responsible for multiplexing the internal traffic, (i.e., requesting the necessary bandwidth that cable modem 116 needs to transfer its current types of data). Cable modem scheduler 116 must take into consideration the different priorities given to the current data to be transferred and to request bandwidth from CMTS 102 accordingly.

As stated above, DOCSIS is a common cable modem standard used today. DOCSIS provides standard centralized scheduling decisions that do not allow for flexibility in terms of deciding when cable modem 104 requests bandwidth from CMTS 102 in order to transfer its current data. Cable modem scheduler 116 defines an architecture that overrules this DOCSIS standard in a seamless manner. Some of the main differences between the DOCSIS standard and cable modem scheduler 116 are described next.

One main difference between the DOCSIS standard and cable modem scheduler 116 includes the decoupling of the request phase with the grant phase (i.e., grants of bandwidth received from CMTS 102). Here, cable modem scheduler 116 uses granted bandwidth as they are received regardless of their size and priority specification, thereby ignoring the DOCSIS standard. Cable modem scheduler 116 ignores the priority id of the granted bandwidth. This means that cable modem scheduler 116 does not have to use the granted bandwidth in the same order in which it was requested. It addition, piggyback requests may be separate requests for bandwidth instead of extended header as done in the DOCSIS standard. How piggyback requests are handled by the present invention are described in detail in related non-provisional application, entitled "Method, System and Computer Program Product for Scheduling Upstream Communications", (Ser. No. 09/783,404). Here, it is important to note that piggybacks requests are treated as separate requests for bandwidth and may or may not be given a priority identifier. In an embodiment, the present designs voice data the highest priority, piggyback requests have the second highest priority and other types of data (including data required for web surfing) is given the lowest priority.

Therefore, cable modem scheduler 116 sends bandwidth requests to CMTS 102 via upstream communication 108. At a high level, each bandwidth request may include three fields. The three fields are a data provider identifier, a priority identifier, and the amount of required bandwidth. In an embodiment of the present invention, the bandwidth request does not include the data provider identifier as a field. Here, the data provider identifier is implicit (e.g. piggyback request. These three fields will be briefly described next.

Each cable modem 104 has a unique data provider identifier. CMTS 102 uses this identifier to grant the requested bandwidth to cable modem 104. Priority identifiers indicate the priority given to the data and thus indicating the type of data that will be transferred over the cable network via the granted bandwidth. Finally, the last field is value indicating the amount of required bandwidth needed to transfer the data, CMTS 102. CMTS scheduler 110 and data structure 112 will not be described.

CMTS 102 is a central device for connecting the cable network to a data network. CMTS scheduler 102 is a bandwidth manager. CMTS scheduler 102, as a bandwidth manager, decides how to grant available bandwidth according to the current bandwidth requests. This grant is done via downstream communication 106 in such as way as to reduce overhead. This ability to decide how to grant available bandwidth provides flexibility. This flexibility allows the present invention to reduce the overhead involved in granting bandwidth to cable modem 104 via downstream communication. Data structure 112 is used to organized the received bandwidth requests in such as way as to take into consideration the type of data (via the priority identifiers) and the order in which the requests were received.

As described above, the way in which the DOCSIS CMTS scheduler grants bandwidth is quite restrictive, thus creating unnecessary overhead in downstream communication. The details of how CMTS scheduler 110 grants bandwidth to cable modem 104 so that to decrease overhead will be described in detail below. The overhead in each granted bandwidth will be described next with reference to FIG. 2.

C. Granted Bandwidth Overhead

Figure 2:
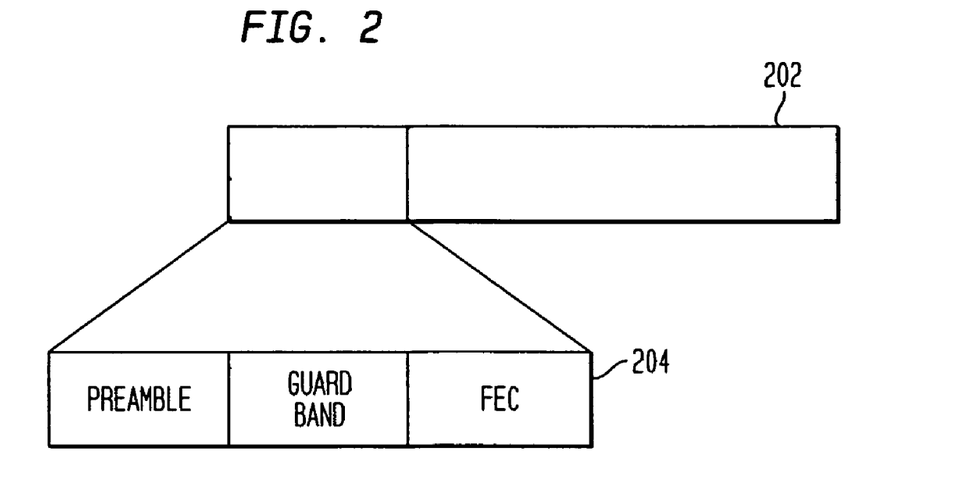
FIG. 2 illustrates an example of granted bandwidth according to an embodiment of the present invention.

FIG. 2 illustrates an example of granted bandwidth 202. As shown, granted bandwidth shows overhead 204 including a preamble, a guard band and a forward error correction ("FEC"). The preamble is a pattern of bits transmitted at the start of a frame used to implement transmitter and receiver synchronization. The guard band is the time left vacant between adjacent transmissions to allow for detection certainty and clock synchronization inaccuracies in an asynchronous communication system. The FEC is the process whereby additional bits are appended to a block of bits so that the receiver will be able to both detect and correct transmission errors.

Overhead 204 may be referred to as the physical layer overhead. Regardless of the size of granted bandwidth 202, overhead 204 uses approximately the same amount of bytes. Where the preamble and guard band are typically fixed in size, the FEC is a variable size that depends on the amount of bandwidth. Therefore, the larger the granted bandwidth, the greater the efficiency. However, larger granted bandwidths mean greater end-to-end delay experienced by a voice call, for example. Thus, when granting bandwidth, end-to-end delay versus gained efficiency must be taken into consideration.

Different systems may reserve different amount of bytes for overhead 204. How the present invention combines bandwidth requests from the same cable modem 104 to create a single data burst bandwidth is described next.

D. Combination of Bandwidth Grants

As mentioned above, cable modem scheduler 116 may send different bandwidth requests to CMTS 102, including but not limited to, voice, piggyback and data for activities such as web surfing. Thus, at any given time, CMTS 102 may have more than one request for the same cable modem. This is especially true since cable modem scheduler 104 piggybacks requests as often as possible. These requests may have different priority identifiers values or the same priority identifier value for data that has arrived at CMTS 102 at different times.

Figure 3:
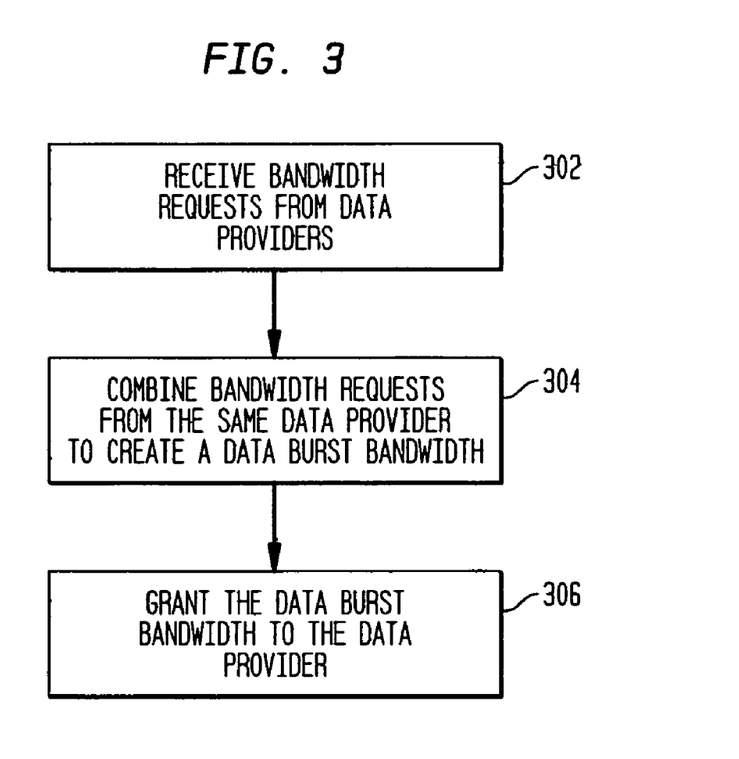
FIG. 3 is a high level flowchart that describes the process of combining bandwidth requests according to an embodiment of the present invention.

A goal of the present invention is to combine all pending bandwidth requests from the same cable modem into one data burst bandwidth request. Here, instead of individual requests being granted which would require physical overhead for each grant, the present invention reduces the physical over to one for all of the individual requests by combining them. This can be accomplished by the present invention partly because there is a decoupling of the request phase (i.e., bandwidth requests from cable modem 104) with the grant phase (i.e., grants of bandwidth received from CMTS 102), as mentioned above. CMTS scheduler 110 needs to take into consideration end-to-end delay verses the gained efficiency. FIG. 3 is a high level flowchart that describes the process of combining bandwidth requests according to an embodiment of the present invention.

In FIG. 3, control starts at step 302. In step 302, CMTS 102 receives one or more bandwidths requests from one or more cable modems 104 via upstream communication 108. Control then passes to step 304.

In step 304, CMTS scheduler 110 combines one or more bandwidths requests from the same cable modem 104 to create a single data burst bandwidth. Control then passes to step 306.

In step 306, CMTS 102 grants the data burst bandwidth to the appropriate cable modem 104 via downstream communication 106. The flowchart in FIG. 3 ends at this point. Next, two different embodiments of step 304 are described. The first embodiment is described with reference to FIGS. 4–6. Here, bandwidth requests are scheduled to be serviced based on priority identifiers (i.e., type of data) and the order in which the requests for bandwidth were received. The second embodiment of step 304 is described with reference to FIGS. 8 and 9. Here, bandwidth requests are scheduled to be serviced based on various quality of service parameters.

Figure 4:
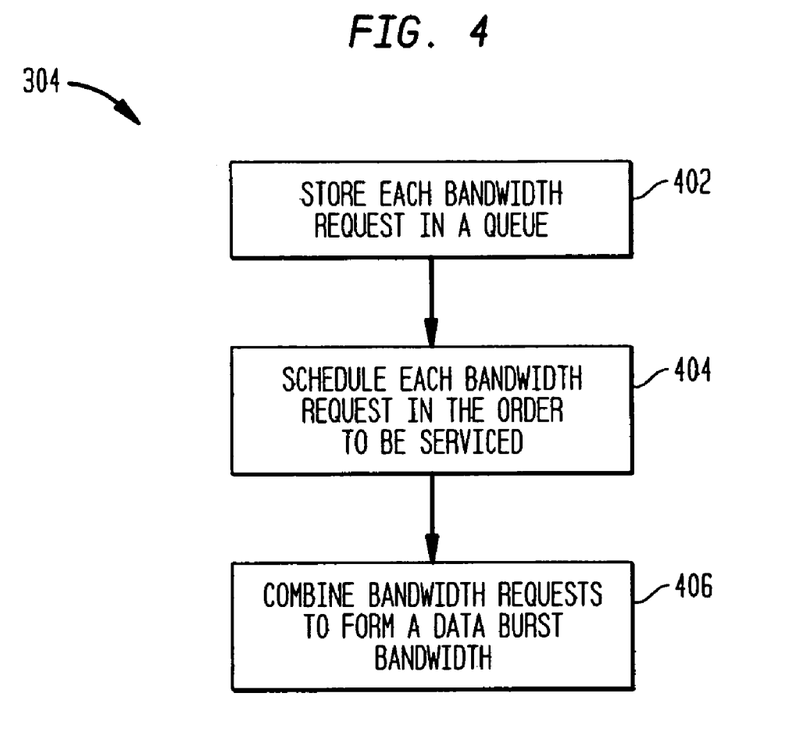
FIG. 4 describes in detail the step of combining bandwidth requests from the same data provider (e.g., cable modem 104) to create a data burst bandwidth (step 304 of FIG. 3) according to an embodiment of the present invention.

FIG. 4 describes in detail the step of combining bandwidth requests from the same data provider (e.g., cable modem 104) to create a data burst bandwidth (step 304 of FIG. 3) according to an embodiment of the present invention. In FIG. 4, control starts at step 402. In step 402, as CMTS 102 receives bandwidth requests from one or more cable modems 104, CMTS scheduler 112 stores each bandwidth request in data structure 112. In an embodiment of the present invention, data structure 112 is implemented as one or more queues and CMTS scheduler 112 is implements as a priority first come first serve scheduler. Data structure 112 as implemented as one or more queues is shown in FIG. 5.

Figure 5:
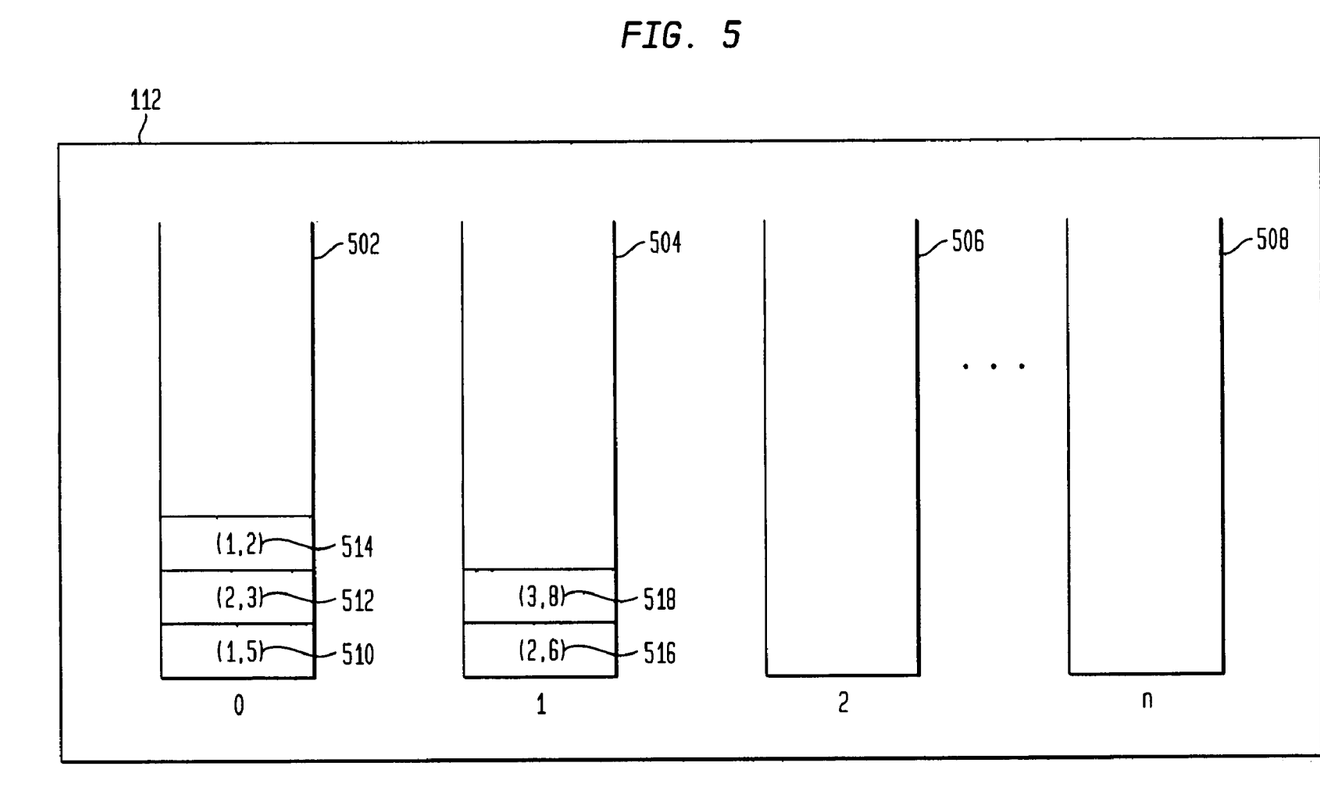
FIG. 5 illustrates multiple queues with example priority identifiers values according to an embodiment of the present invention.

FIG. 5 illustrates multiple queues with priority identifiers values 1 through n. Queue 502 stores the data request with the highest priority (i.e., 0). Queue 508 stores the data with the lowest priority (i.e., n). Queues 504 and 506 store data with priority values in between the highest and the lowest. In any event, each queue has its own priority value and all requests stored in any of the queues must have the same priority identifier values.

As illustrated in FIG. 5, queue 502 currently stores three bandwidth requests, including requests 510–514. Queue 504 stores two bandwidth request, including requests 516 and 518. Neither queue 506 or queue 508 are currently storing any bandwidth request.

Each bandwidth request is indicated as (n,m), where n is the data provider identifier and m is the amount of required bandwidth. As described above, each bandwidth request includes at least three fields, including the data provider identifier, the priority identifier, and the amount of required bandwidth. For example, bandwidth request 510 has a priority identifier value of 0, the cable modem 104 who sent the request has the data provider identifier of 1 and it is requesting 5 units of bandwidth. In addition, bandwidth request 510 arrived at CMTS 102 before bandwidth request 512, which in turn arrived before bandwidth request 514, as indicated by their positions in queue 502. It is important to note that bandwidth request 516 may arrive at CMTS 102 before bandwidth request 514, but bandwidth request 514 is still likely to be granted bandwidth first due to it having a higher priority identifier.

Also illustrated by FIG. 5 is that the cable modem 104 that has the data provider value of 2 has two bandwidth requests, including requests 512 and 516. It is important to note that these two requests are for data that have different priority identifier values (e.g., requests for voice and piggyback). Control then passes to step 404.

Figure 6:
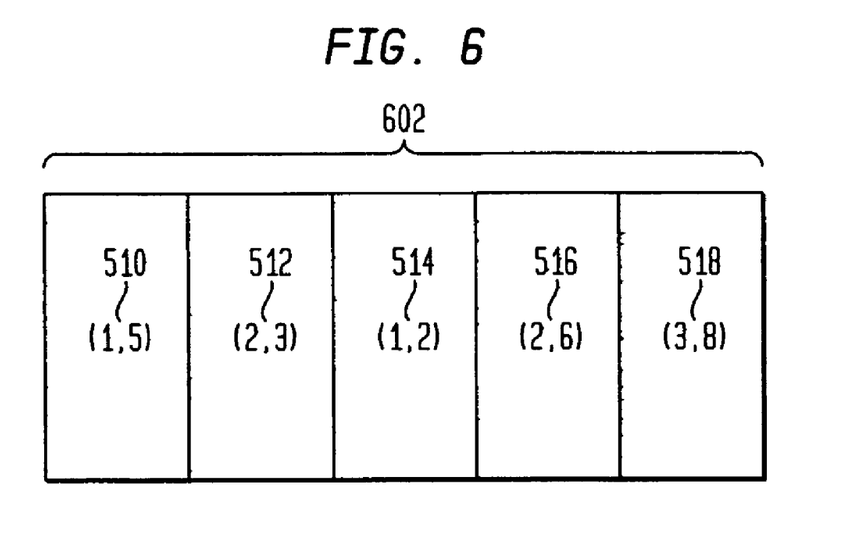
FIG. 6 illustrates an example scheduling that is based on the example data structure shown in FIG. 5 according to another embodiment of the present invention.

In step 404, CMTS scheduler 110 schedules each bandwidth request stored in data structure 112 in an order to be serviced by the present invention. Here, bandwidth requests are scheduled to be serviced based on priority identifiers (i.e., type of data) and the order in which the requests for bandwidth were received. An example scheduling that is based on the example data structure shown in FIG. 5 is shown in FIG. 6 as schedule 602. In schedule 602, request 510 is scheduled first, request 512 is scheduled second, and so forth. Control then passes to step 406.

Figure 7:
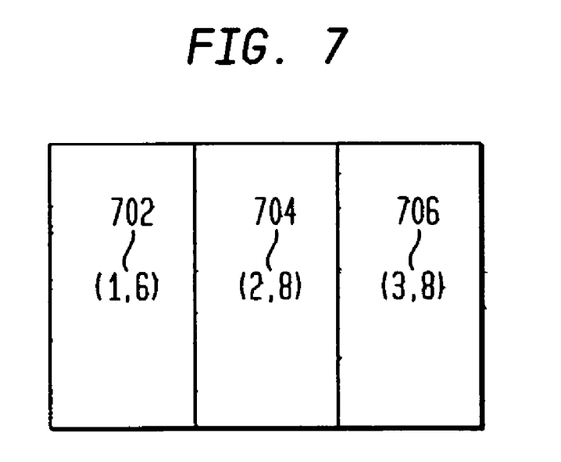
FIG. 7 illustrates how the CMTS scheduler utilizes an example schedule shown in FIG. 6 to combine bandwidth requests from the same cable modem to create a single data burst bandwidth for each cable modem according to another embodiment of the present invention.

In step 406, CMTS scheduler 110 utilizes schedule 602 to combine bandwidth requests from the same cable modem 104 to create a single data burst bandwidth for each cable modem 104 (i.e., data provider identifier). This is illustrated in FIG. 7. In FIG. 7, data burst bandwidth 702 is created by combining bandwidth requests 510 and 514. Data burst bandwidth 704 is created by combining bandwidth requests 512 and 516. Finally, data burst bandwidth 706 is identical to bandwidth request 518. It is important to note that the conversion between storage units may alter the units of storage required. For example, this account for why data burst bandwidth 702 is (1, 6) and not (1, 7). This is for illustration purposes only and is not meant to limit the present invention.

At this point, data burst bandwidths 702–706 are ready to be granted to their appropriate cable modems as accomplished in step 306 (FIG. 3). The flowchart in FIG. 4 ends at this point. The second embodiment of step 304 will now be described with reference to FIGS. 8 and 9.

As mentioned above, bandwidth requests in this embodiment are scheduled to be serviced based on various quality of service parameters.

Figure 8:
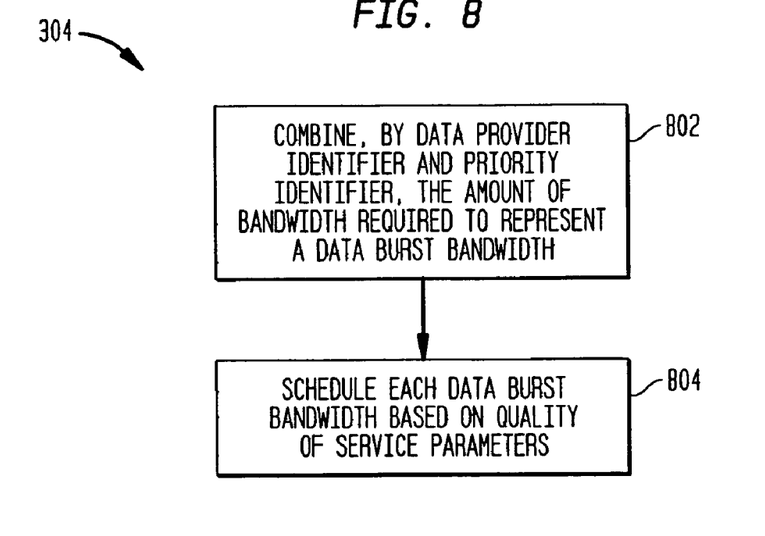
FIG. 8 describes in detail the step of combining bandwidth requests from the same data provider (e.g. cable modem 104) to create a data burst bandwidth (step 304 of FIG. 3) according to another embodiment of the present invention.

FIG. 8 describes in detail the step of combining bandwidth requests from the same data provider (e.g., cable modem 104) to create a data burst bandwidth (step 304 of FIG. 3) according to another embodiment of the present invention. In FIG. 8, control starts at step 802. In step 802, as CMTS 102 receives bandwidth requests from one or more cable modems 104, CMTS scheduler 112 combines or accumulates the sum of the units of bandwidth requested per priority identifier and data provider identifier. This sum represents what will be required to represent the data burst bandwidths. The accumulation of units of bandwidth requested is illustrated in FIG. 9.

Figure 9:
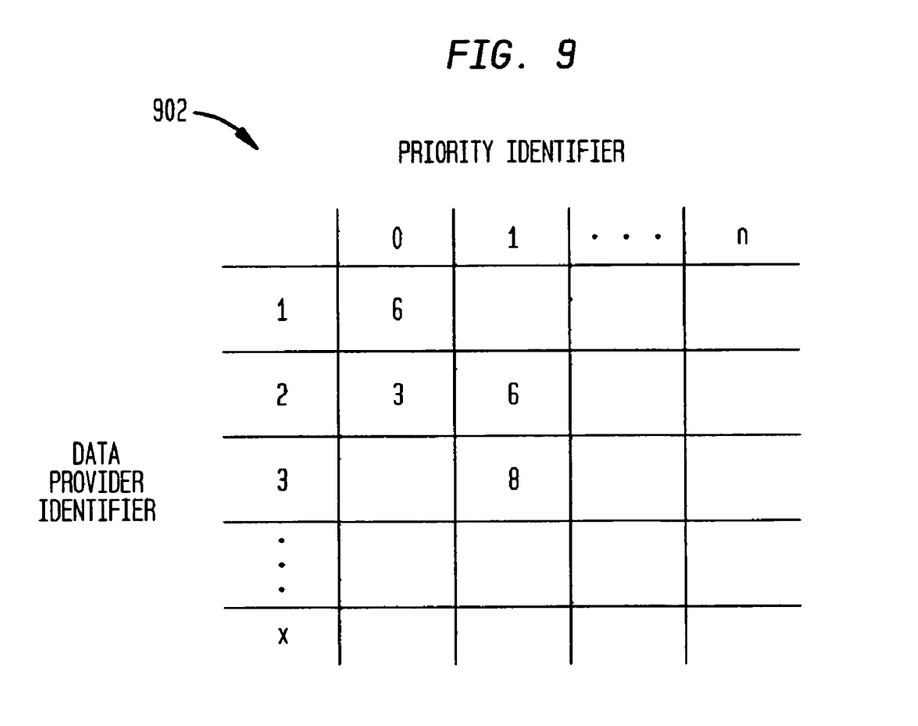
FIG. 9 illustrates a table used by the flowchart in FIG. 8 according to another embodiment of the present invention.

In FIG. 9, a table 902 is shown. The columns of table 902 represent the priority identifier (i.e., type of data in the request). The rows of table 902 represent the data provider identifiers. The cells of table 902 represent the accumulation of units of requested bandwidth by priority identifier and data provider identifier. For illustration purposes, it is assumed that the same bandwidth requests are received by CMTS 102 as received and explained with reference to FIG. 5 above. Therefore, an accumulation 904 (with the value 7) is calculated by bandwidth request 510 and bandwidth request 514 (requesting 5 and 2 units of bandwidth, respectively). Control then passes to step 804.

In step 804, CMTS scheduler 110 schedules each data burst bandwidth based on quality of service parameters. Quality of service parameters include efficiency of transmission and transfer delay tolerance. As stated above, different types of data require different modes of transfer since the importance of timing is different with different types of data. For example, voice data cannot tolerate delays in its transfer. Alternatively, the type of data involved in web surfing can tolerate delays in its transfer.

The priority identifier specified in the request is not significantly important since the cable modem scheduler does not use it 104 when transferring data via the bandwidth. For consistency in all cases is desired, the present invention may specify that the priority identifier of the data burst bandwidth gets the lowest priority that contributes to the accumulated sum. Also note that this embodiment may choice to incorporate scheduling, as shown in FIG. 6 above, and the combination of bandwidth requests, as shown in FIG. 7 above. At this point, data burst bandwidths are ready to be granted to their appropriate cable modems as accomplished in step 306 (FIG. 3). The flowchart in FIG. 8 ends at this point.

E. Example Environment of the Present Invention

Figure 10:
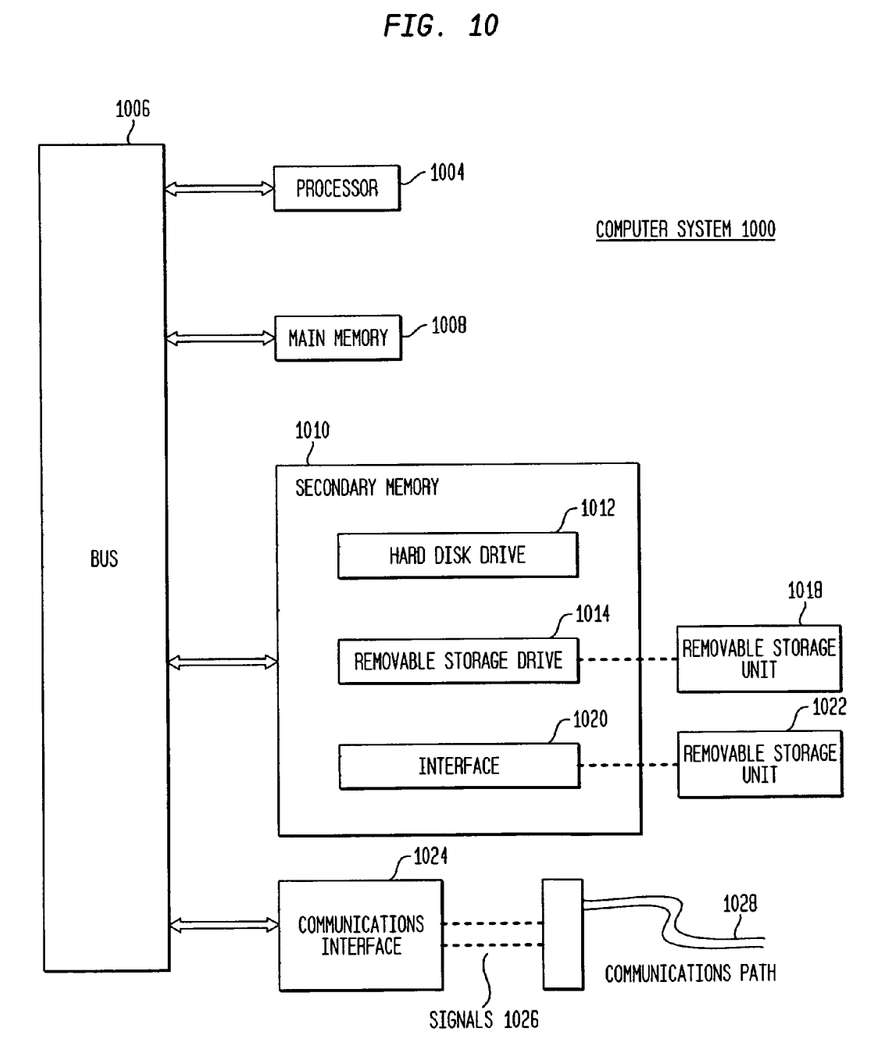
FIG. 10 illustrates an example computer used to implement the CMTS, the CMTS scheduler and the cable modem scheduler according to and embodiment of the present invention.

CMTS 102, CMTS scheduler 110 and cable modem scheduler 116 may be implemented using computer 1000 as shown in FIG. 10. Obviously, more than one of these functional components could be implemented on a single computer 1000.

The present invention may be implemented using hardware, software or a combination thereof and may be implemented in a computer system or other processing system. In fact, in one embodiment, the invention is directed toward one or more computer systems capable of carrying out the functionality described herein. The computer system 1000 includes one or more processors, such as processor 1004. The processor 1004 is connected to a communication bus 1006. Various software embodiments are described in terms of this example computer system. After reading this description, it will become apparent to a person skilled in the relevant art how to implement the invention using other computer systems and/or computer architectures.

Computer system 1000 also includes a main memory 1008, preferably random access memory (RAM), and can also include a secondary memory 1010. The secondary memory 1010 can include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1018 to computer system 1000.

Computer system 1000 can also include a communications interface 1024. Communications interface 1024 allows software and data to be transferred between computer system 1000 and external devices. Examples of communications interface 1024 can include a modem, a network interface (such as an Ethernet card), a communications port, a PCMCIA slot and card, etc. Software and data transferred via communications interface 1024 are in the form of signals which can be electronic, electromagnetic, optical or other signals capable of being received by communications interface 1024. These signals 1026 are provided to communications interface via a channel 1028. This channel 1028 carries signals 1026 and can be implemented using wire or cable, fiber optics, a phone line, a cellular phone link, an RF link and other communications channels.

In this document, the terms "computer program medium" and "computer usable medium" are used to generally refer to media such as removable storage device 1018, a hard disk installed in hard disk drive 1012, and signals 1026. These computer program products are means for providing software to computer system 1000.

Computer programs (also called computer control logic) are stored in main memory and/or secondary memory 1010. Computer programs can also be received via communications interface 1024. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

F. CONCLUSION

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for combining requests for bandwidth by a data provider for transmission of data over an asynchronous communication medium, comprising the steps of:

receiving bandwidth requests from one or more data providers, each bandwidth request having a data provider identifier, a priority identifier that identifies a type of data to be transmitted, and an amount of required bandwidth;

storing the bandwidth requests in a data structure so as to maintain an order in which the bandwidth requests were received;

scheduling the bandwidth requests in an order to be serviced based on the priority identifier and the order in which the bandwidth requests were received;

calculating a data burst bandwidth for each of the one or more data providers by combining the amount of required bandwidth specified in schedule bandwidth requests having the same data provider identifier; and granting said data burst bandwidths to respective data providers over the asynchronous communication medium.

2. The method of claim 1, wherein said asynchronous communication medium is cable TV.

3. The method of claim 1, wherein said asynchronous communication medium is wireless.

4. The method of claim 1, wherein said asynchronous communication medium is satellite.

5. The method of claim 1, wherein said asynchronous communication medium is the Internet.

6. The method of claim 1, wherein said order to be serviced is determined by servicing bandwidth requests having a higher priority identifier before bandwidth requests having a lower priority identifier, and servicing the bandwidth requests were received.

7. The method of claim 1, wherein at least one data burst bandwidth is calculated by combining the amount of required bandwidth specified in scheduled bandwidth requests having different priority identifiers.

8. The method of claim 1, wherein said data structure is comprised of one or more queues.

9. A method for combining requests for bandwidth by a data provider for transmission of data over an asynchronous communication medium, comprising the steps of:

receiving bandwidth requests from one or more data providers, each bandwidth request having a data provider identifier, a priority identifier, and the amount of required bandwidth;

calculating a data burst bandwidth by combining the amount of required bandwidth specified in bandwidth requests having the same data provider identifier and the same priority identifier; and scheduling the granting of the data burst bandwidth to a data provider based on one or more quality of service parameters.

10. The method of claim 9, wherein said quality of service parameters include efficiency of transmission and transfer delay tolerance.

11. The method of claim 9, wherein said asynchronous communication medium is cable TV.

12. The method of claim 9, wherein said asynchronous communication medium is wireless.

13. The method of claim 9, wherein said asynchronous communication medium is satellite.

14. The method of claim 9, wherein said asynchronous communication medium is the Internet.

15. The method of claim 9, wherein said scheduling the granting of the data burst bandwidth to a data provider is also based on at least one of the priority identifier and an order in which the bandwidth requests were received.

16. A system for combining requests for bandwidth by a data provider for transmission of data over an asynchronous communication medium, comprising:

a headend; and a scheduler coupled to said headend, wherein said scheduler receives bandwidth requests from one or more data providers, each bandwidth request having a data provider identifier, a priority identifier that identifies a type of data to be transmitted, and an amount of required bandwidth, wherein said scheduler stores each of the bandwidth requests in a data structure so as to maintain the order in which the bandwidth requests were received, wherein said scheduler schedules the said bandwidth requests in an order to be serviced based on said priority identifier and said order in which the bandwidth requests were received, and wherein said scheduler calculates a data burst bandwidth for each of said one or more data providers by combining the amount of required bandwidth specified in scheduled bandwidth requests having the same data provider identifier, and wherein said headend grants said data burst bandwidths to respective data providers over the asynchronous communication medium.

17. The system of claim 16, wherein said asynchronous communication medium is cable TV.

18. The system of claim 16, wherein said asynchronous communication medium is wireless.

19. The system of claim 16, wherein said asynchronous communication medium is satellite.

20. The system of claim 16, wherein said asynchronous communication medium is the Internet.

21. The system of claim 16, wherein said order to be serviced is determined by servicing bandwidth requests having a higher priority identifier before bandwidth requests having a lower priority identifier, and servicing the bandwidth request for each priority identifier according to said order in which the bandwidth request were received.

22. The system of claim 16, wherein at least one data burst bandwidth is calculated by combining the amount of required bandwidth specified in scheduled bandwidth requests having different priority identifiers.

23. The system of claim 16, wherein said data structure is comprised of one or more queues.

24. A system for combining requests for bandwidth by a data provider for transmission of data over an asynchronous communication medium, comprising:

a headend; and a scheduler coupled to said headend, wherein said scheduler receives bandwidth requests from one or more data providers, each bandwidth request having a data provider identifier, a priority identifier, and the amount of required bandwidth, wherein said scheduler calculates a data burst bandwidth by combining the amount of required bandwidth specified in bandwidth requests having the same data provider identifier and the same priority identifier, wherein said scheduler schedules the granting of the data burst bandwidth to a data provider based on one or more quality of service parameters.

25. The system of claim 24, wherein said quality of service parameters include efficiency of transmission and transfer delay tolerance.

26. The system of claim 24, wherein said asynchronous communication medium is cable TV.

27. The system of claim 24, wherein said asynchronous communication medium is wireless.

28. The system of claim 24, wherein said asynchronous communication medium is satellite.

29. The system of claim 24, wherein said asynchronous communication medium is the Internet.

30. The system of claim 24, wherein said scheduler also schedules the granting of the data burst bandwidth to a data provider based on at least one of the priority identifier and an order in which the bandwidth requests were received.

* * * * *